Figure 1:
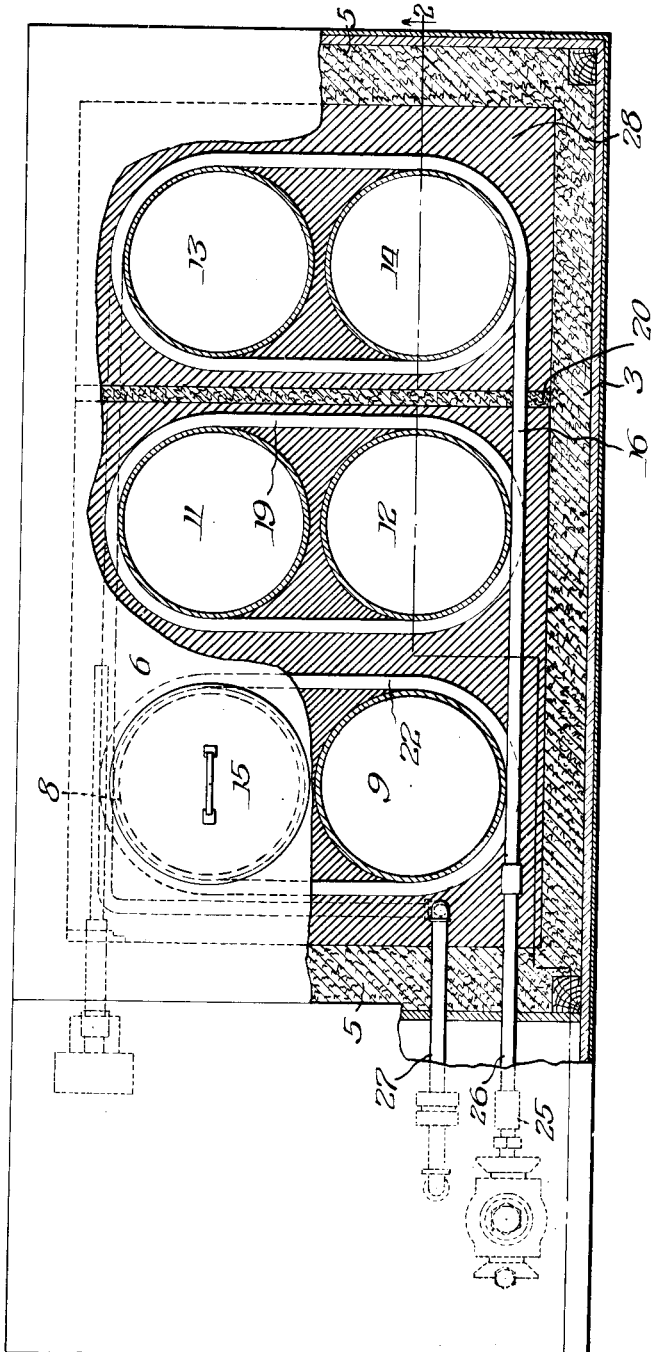

June 16, 1925.

F. E. DENNISON

REFRIGERATING CABINET

Filed May 12, 1924

1,541,797

2 Sheets-Sheet 1

June 16, 1925.

F. E. DENNISON

REFRIGERATING CABINET

Filed May 12, 1924

1,541,797

2 Sheets-Sheet 2

Witness:
Fred C. Lawson

Inventor
French F. Dennison
By Chas. J. Wilson
Atty.

Patented June 16, 1925.

1,541,797

UNITED STATES PATENT OFFICE.

FRENCH E. DENNISON, OF BELOIT, WISCONSIN, ASSIGNOR TO LIPMAN REFRIGERATION COMPANY, OF BELOIT, WISCONSIN, A CORPORATION OF DELAWARE.

REFRIGERATING CABINET.

Application filed May 12, 1924. Serial No. 712,511.

*To all whom it may concern:*

Be it known that I, FRENCH E. DENNISON, a citizen of the United States, residing at Beloit, in the county of Rock and State of Wisconsin, have invented certain new and useful Improvements in Refrigerating Cabinets, of which the following is a specification.

This invention pertains to refrigerating cabinets and the principles thereof may be embodied in cabinets adapted for various purposes, such, for instance, as storage chambers for the preservation and cooling of foods, beverages or other products, and may be designed into various apparatus employed in connection with soda fountains or other places where the cooling of various foods, beverages or other commodities is desirable.

Prior to my invention it has been the general practice, in ice cream storage cabinets, for instance, in which the ice cream is stored and from which it is dispensed at the soda fountain or other places, to employ a cabinet in the form of a liquid tight metal tank enclosed in suitable insulation and having a plurality of containers arranged therein in which the food products such as ice cream are stored. The space around these containers and within the tank is either filled with ice and salt to maintain the containers at a low temperature or in the more modern cabinets this space is filled with brine and the expansion coils of a mechanical refrigerating mechanism are extended into the cabinet where they are surrounded by the brine. The coils, therefore, cool the brine and the brine cools the containers and keeps them at the desired low temperature. Cabinets of this character, however, are very expensive, they are apt to leak, the brine must be continually renewed and replenished and all of the containers in the brine are maintained at the same temperature. This latter feature is undesirable for the reason that bulk ice cream should be maintained at one temperature, while brick ice cream should be maintained at a different temperature.

One of the primary purposes of my present invention is to entirely eliminate the use of either ice or brine in refrigerating cabinets, thus relieving the owner of the cabinet from the expense of ice maintenance or of brine renewal as the case may be, and also obviating any danger of leakage which, of course, is very annoying. By the elimination of these undesirable attributes of cabinets heretofore employed my improved cabinet is rendered highly desirable to the cabinet users. From the manufacturer's standpoint also my improved cabinet possesses the advantage that the metal tank heretofore necessary in order to hold the brine or melted ice is entirely dispensed with and the manufacturing cost of the cabinet is correspondingly reduced.

Another purpose of my invention is to provide a cabinet which will be capable of producing different temperatures in different containers or food receptacles so that a variety of temperatures may be maintained suitable for the storage and preservation of various commodities.

Another advantageous feature of my invention resides in the fact that the expansion or cooling coils of the refrigerating system are kept dry. They are not only not subjected to the corrosive action of brine as has heretofore been the case in cabinets where brine was employed as a cooling medium, but by the construction of my cabinet the formation of condensation upon the exterior of the coils is prevented, with the result that the exterior of the coils is always dry, thus prolonging the life of the coils and at the same time rendering the whole apparatus more sanitary and satisfactory.

These desirable results, and others, are attained in my invention by imbedding the refrigerating coils in the cabinet in a suitable substance which is introduced into the cabinet structure while in a plastic or semi-fluid condition and which when hardened or set completely fills the space within the cabinet walls and around the coils and also fills the space or voids between the convolutions of the coils so that the coils are completely imbedded in and surrounded by this substance.

For the purpose of facilitating an understanding of my invention I have illustrated on the accompanying drawings a preferred embodiment thereof and when considered in connection with the following description my invention and many of its inherent advantages should be appreciated.

Referring to the drawings,—

Figure 2:
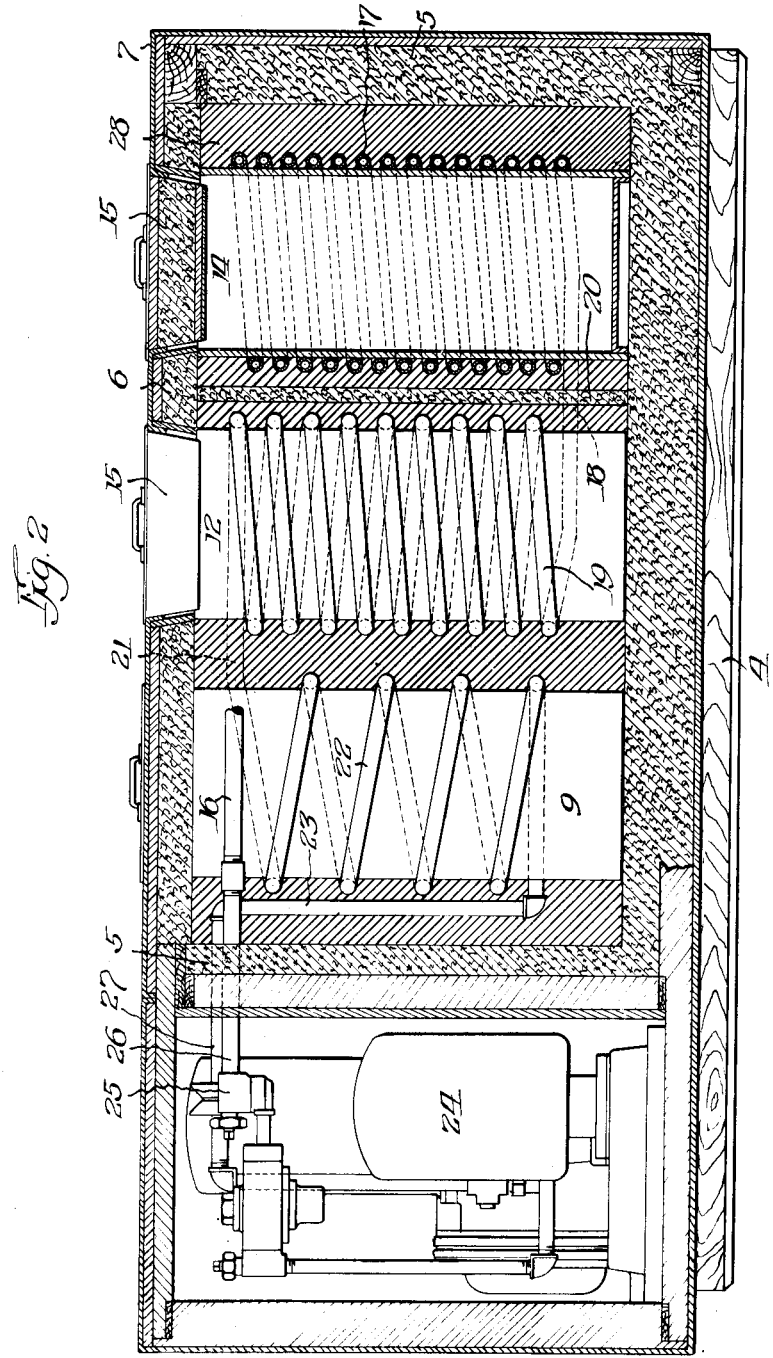

Fig. 1 is a plan view with part of the top broken away, of a cabinet constructed in accordance with my invention, and Fig. 2 is a sectional view on the line 2—2 of Fig. 1.

Referring now to the drawings more in detail, it will be observed that the cabinet proper comprises side walls 3, bottom 4, end walls 5, and a top 6, all comprising in their construction heat insulating material so as to provide a heat insulated compartment within which the refrigerating coils and food containers and the like are disposed. While the structure of the walls of the cabinet may vary, they preferably comprise a frame structure to which cork board or other heat insulating material is applied, the whole structure being enclosed in an outer sheathing 7 of enameled metal or other preferred material.

Within this heat insulated chamber thus formed are disposed what will be termed the food containers. The particular cabinet shown is equipped with six of such containers, which are indicated by reference characters 8, 9, 11, 12, 13 and 14, respectively, and these containers are shown as being cylindrical in shape, but manifestly they may be of any desired shape and proportion and the number may be greater or less as occasion requires. Each of the containers has an open top through which access to the interior of the container is had and the containers are normally closed by removable tops or covers 15.

These containers are adapted to be brought to and maintained at the desired low temperature by the action of the refrigerating or expansion coils of a refrigerating apparatus and while the coils may be arranged in a variety of ways, one practical arrangement is disclosed in the drawings, from which it will be observed that the supply pipe 16 for the refrigerating medium, such as ammonia for instance, passes first longitudinally of the cabinet to a point near the top of a container 14, whereupon it is wound in a series of convolutions downwardly around containers 13 and 14, providing a coil 17 wrapped tightly around the containers and in contact with a portion of the perimeter of each. From the bottom of this coil the pipe is extended, as indicated at 18, to the containers 11 and 12, around which it is coiled upwardly to form the coil 19 preferably having a less number of convolutions than the coil 17. The pipe is then continued as shown at 21 to the receptacles 8 and 9, around which it is coiled downwardly forming the coil 22, and the delivery end is then carried upwardly as indicated at 23 and passes outwardly through the end wall 5.

The refrigerating work performed upon the coils may be produced by any suitable refrigerating machine and in the present instance I have shown merely for illustrative purposes a conventional machine, which is indicated generally by reference character 24, the machine being of the compression type and having a regulatable expansion valve 25 interposed in the expansion pipe 26 of the circuit. The suction pipe 27 leading from the expansion coils is connected with the intake side of the compresser in the usual manner. This refrigerating machine may be mounted in any convenient location remote from or in proximity to the cooling cabinet but for convenience it is shown as preferably installed in a compartment provided at one end of the cabinet, as illustrated on the drawings and particularly Fig. 2.

The space around the containers and within the insulating walls of the cabinet, and also the voids between the various convolutions of the coils, is filled in accordance with my invention with a suitable solid non-porous material having relatively low heat conducting properties and relatively high thermal capacity. Experimentation has shown that asphalt or an asphaltic or bituminous compound, such as is indicated on the drawings by reference character 28, is admirably suited to accomplish the desired results but other materials may be employed with varying degrees of success and it should, therefore, be understood that my invention is not restricted to the employment of asphalt but comprehends such materials having similar properties as are capable of successful use for the attainment of the desired results.

This asphalt is introduced into the cabinet in a semi-fluid or plastic condition so that it will flow around the containers and coils and completely fill all of the voids and interstices within the cabinet walls and will adhere closely to the walls of the containers and coils, thereby serving as a mechanical support to strengthen and reinforce both the coils and the containers and to also seal the coils and the exterior of the containers from the air. This sealing effect obviates the formation of condensation on the coils and also upon the outside of the containers and thereby greatly increases the longevity of both the coils and the containers. My invention, however, should not be understood as being restricted to the employment of metal containers such as shown, for the reason that in some instances the containers or their equivalent might serve merely as cores to hold the asphalt or other material in place until it had set, whereupon the core might be withdrawn leaving a recess or compartment formed in and by the material itself. The inside of such a compartment might be coated or finished in any suitable manner and would be, so far as refrigerating qualities are concerned, substantially as satisfactory as though the metal container formed a part of the structure. I have found, however, that it is preferable for sanitary reasons to employ containers preferably made of sheet metal as illustrated on the drawings.

This material which completely fills the space surrounding the containers and coils and in which the containers and coils are imbedded, prevents the transmission of heat units to the coils from the space around the coils, confines the refrigerating effect of the coils to the immediate vicinity of the food compartments, and serves to prevent temperature fluctuations in these compartments even though the refrigerating apparatus should fail to operate for a considerable period of time. It serves, therefore, as a factor of storage for refrigerative work performed by the refrigerating apparatus and as such greatly prolongs the hold over period, or in other words the period of time which must elapse after the cessation of refrigerative work before the temperature within the food compartments will materially rise.

The refrigerating coils are shown as comprising different numbers of convolutions and this is for the purpose of producing different temperatures in the storage compartments. Obviously, compartments 13 and 14 being surrounded by the larger number of convolutions and being nearest the expansion valve will be maintained at the lowest temperature. The compartments 11 and 12 being farther from the expansion valve and being surrounded by a less number of convolutions will be maintained at a somewhat higher temperature, and similarly compartments 8 and 9 being still farther from the expansion valve and embraced by a still smaller number of convolutions will be maintained at a still higher temperature. Provision is thereby afforded for the storage of commodities which are best preserved at certain definite but different temperatures.

The employment of the asphalt or similar material as a filler of the cabinet and in which the coils are imbedded imparts to a cabinet constructed in accordance with my invention all of the advantages to be secured by the employment of brine as a refrigerating agent around the food containers, while at the same time it entirely eliminates from the cabinet all of the disadvantages of the use of brine, thereby rendering my improved cabinet highly desirable to the user and also greatly reduces the cost of construction over a brine cabinet to the resultant benefit of the manufacturer. In some instances a partition or wall such as indicated by 20 made of cork or other suitable preferably heat insulating material may be interposed between adjacent containers.

While a preferred embodiment of my invention has been shown and described, obviously the principles of my invention may be utilized in structures differing materially from those herein shown and without departing from the essence of my invention, as defined in the following claims.

I claim:

1. A refrigerating cabinet, comprising a storage compartment surrounded by a refrigerating coil imbedded in a solid non-porous material of relatively low heat conductivity.

2. A refrigerating cabinet, comprising a storage compartment, a refrigerating coil surrounding said compartment, and solid non-porous bituminous material surrounding and sealing said coil from the atmosphere.

3. A refrigerating cabinet, comprising a frame structure, a food container therein and spaced from the walls of said structure, a refrigerating coil surrounding said food container, and a non-porous asphaltic compound filling the space between the frame structure and the container and in which said coil is imbedded.

4. A refrigerating cabinet, comprising a frame structure, a food container disposed therein, a refrigerating coil embracing the perimeter of said container, and a solid non-porous material completely filling the space around the container and within the frame structure and in which said coil is imbedded.

5. A refrigerating cabinet comprising a frame structure, a solid block of non-porous material disposed within said frame structure and provided with a recess adapted to serve as a storage compartment, and a conduit adapted to contain a refrigerant embedded in said block in close proximity to said recess.

6. A refrigerating cabinet, comprising a frame structure, asphalt disposed within said structure, a cylindrical refrigerating coil imbedded in said asphalt, and a food container disposed within said coil.

7. A refrigerating cabinet, comprising an insulated frame structure, a plurality of food containers arranged therein, refrigerating coils surrounding said containers, and asphaltic compound filling the space around said containers within the frame structure.

8. A refrigerating cabinet, comprising a plurality of food containers, refrigerating coils embracing said containers, the number of convolutions in the coil surrounding one container differing from the number of convolutions in the coil surrounding another container, and a solid asphaltic compound in which said containers and coils are imbedded.

9. A refrigerating cabinet, comprising a frame structure, an open top food container disposed therein, a refrigerating coil arranged in contiguous relation to said food container, and solid non-porous material possessing low heat conductivity and high thermal capacity in which said containers and coils are imbedded.

10. A refrigerating cabinet comprising an outer shell including heat insulating material, a refrigerating coil disposed within said shell and spaced from the walls thereof, and a solid non-porous material having low heat conductivity filling the space between said shell and a storage space within the coil, convolutions in said coil being embedded in said material.

FRENCH E. DENNISON.